Oct. 28, 1952     E. THOMSON     2,615,344
POWER TRANSMISSION
Filed Dec. 21, 1945     2 SHEETS—SHEET 1
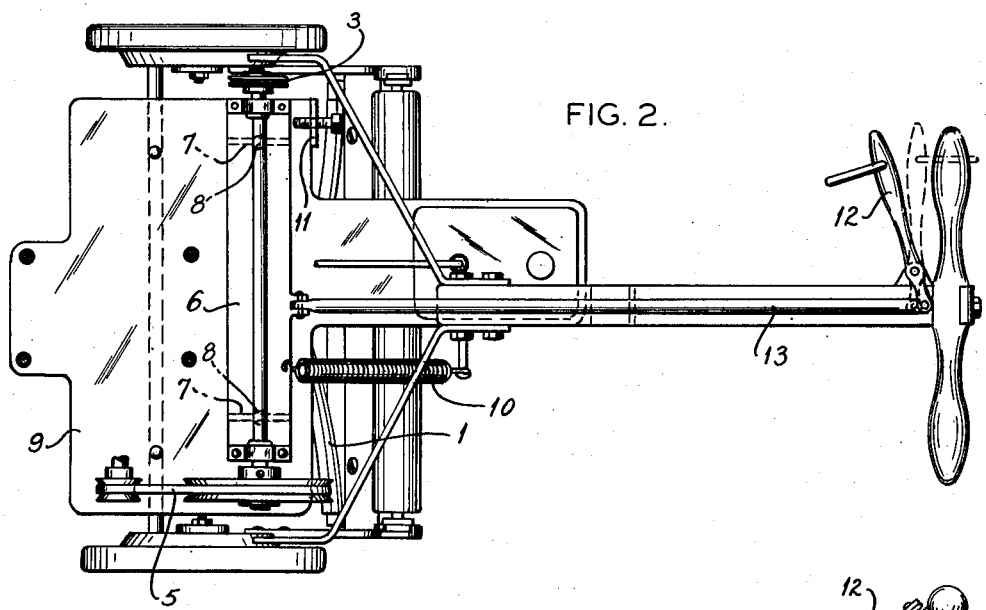
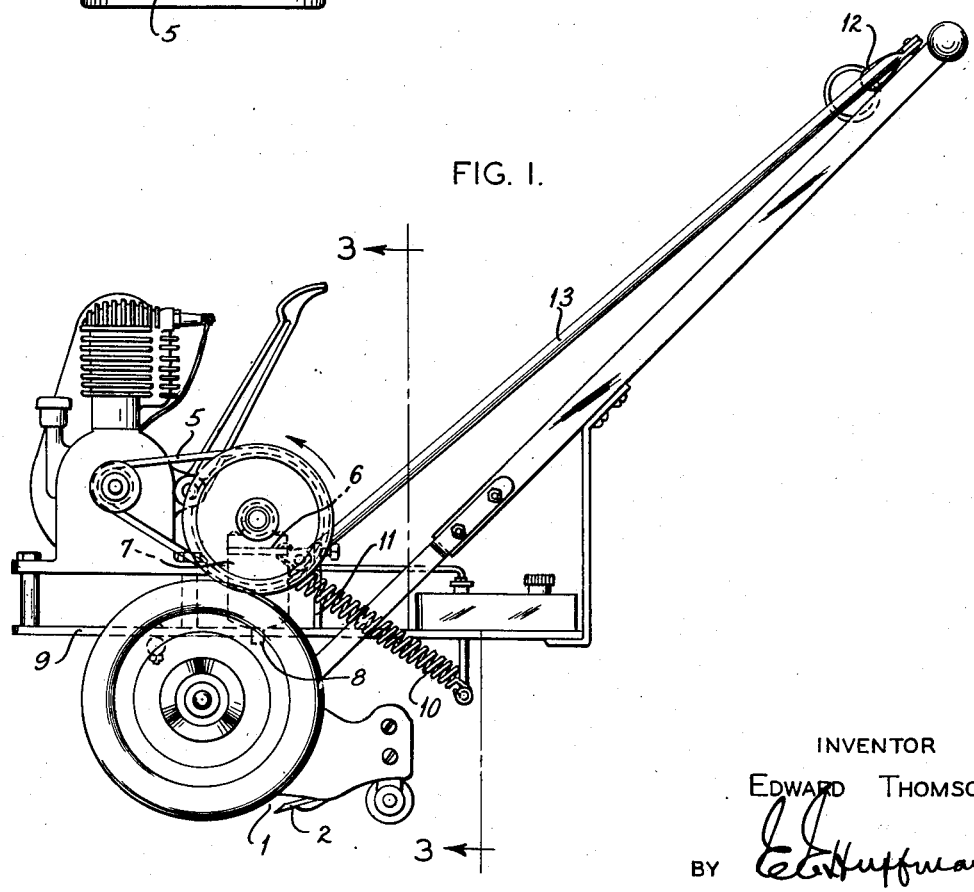
INVENTOR
EDWARD THOMSON
BY
ATTORNEY Oct. 28, 1952 — E. THOMSON — 2,615,344
POWER TRANSMISSION
Filed Dec. 21, 1945 — 2 SHEETS—SHEET 2

INVENTOR
EDWARD THOMSON
BY *E. S. Huffman*
ATTORNEY

Patented Oct. 28, 1952

2,615,344

UNITED STATES PATENT OFFICE 2,615,344

POWER TRANSMISSION

Edward Thomson, Ashley, Ill.

Application December 21, 1945, Serial No. 636,398

6 Claims. (Cl. 74—242.15)

My invention relates to power transmission means one useful application of which is to lawn mowers driven by internal combustion engines and, referring to this particular application, the invention more specifically relates to driving connections which will automatically prevent sufficient resistance being applied to the engine to stop it whether this resistance is due to some obstruction, such as a rock, twig, or other article, getting into position between the blades of the reel and the cooperating cutter blades and stopping the reel, or to encountering grass or other vegetation the power necessary to cut which is in excess of the power of the engine.

Figure 3:
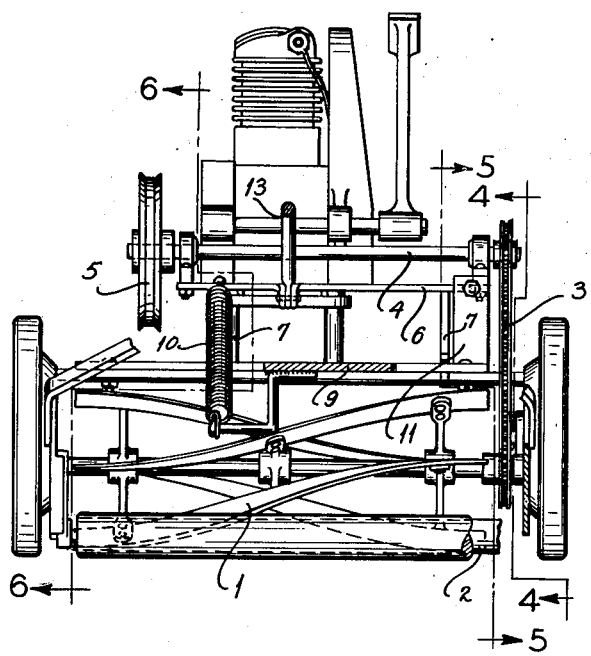
Figure 5:
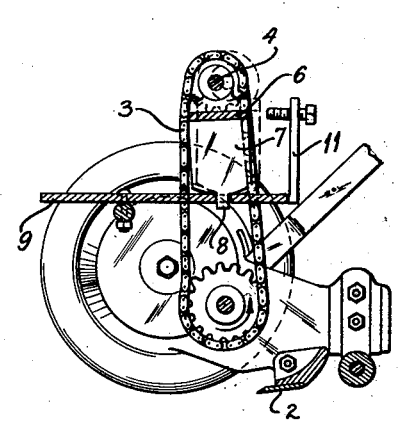
Figure 6:
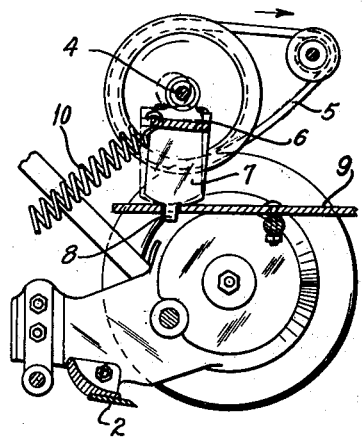
Figure 4:
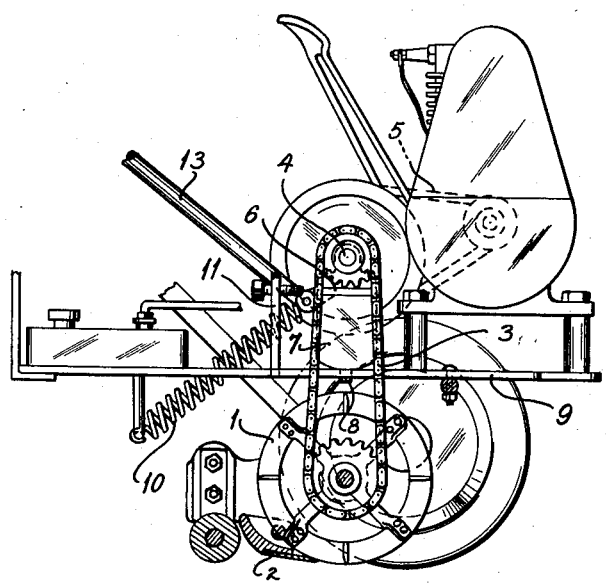

In the drawings Figure 1 is a side view of a power driven lawn mower employing my invention; Figure 2 is a top plan view, the engine being omitted except that the driving pulley on the engine shaft is shown; Figure 3 is a rear elevational view on the line 3—3 of Figure 1; Figure 4 is a vertical view, partly in section and partly in elevation, on the line 4—4 of Figure 3; Figure 5 is a view, partly in elevation and partly in section, on the line 5—5 of Figure 3; and Figure 6 is a similar view on the line 6—6 of Figure 3. In Figures 5 and 6 the full lines show the belt loosened position of the drive shaft and associated parts.

Except as to the driving connections the mower illustrated is of conventional form, the cutting reel 1 being rotated in cooperation with cutter bar 2 by means of a sprocket on the reel shaft driven by chain 3 which is in turn driven by the sprocket on the shaft 4 driven by the engine by means of the pulley and belt 5 shown. My invention relates particularly to the supporting means for the drive shaft 4 which consists of a rockable and tiltable frame element comprising a horizontal bar 6 supported on pedestals 7 at each end. These pedestals are provided with terminal projections 8 receivable in openings through a frame plate 9 of the mower which supports the pedestal.

By reason of the construction described, the horizontal bar 6 and, therefore, the shaft 4 mounted thereon are rockable in a horizontal direction and may tilt somewhat in a vertical direction to slightly elevate the shaft 4 at the pulley end and, therefore, to loosen the driving belt since the pulley shaft is preferably located at a lower horizontal plane than the engine driven shaft to which the belt driving pulley is secured. An obliquely positioned spring 10 attached at one end of the frame of the engine and at the other end to the driving shaft supporting frame 6—7, tends to rock the frame in a horizontal direction to maintain a predetermined tension on the belt in normal operation of the mower and in this normal operation the drive shaft 4 will be maintained in horizontal position approximately within the limits indicated by full and dotted lines in Figure 5.

Should a piece of wood or a bone, for example, be encountered in the mowing operation, which becomes positioned between a reel blade and the cutter blade and, therefore, stops the rotation of the reel, the reaction of the driving power will have a tendency to force the sprocket end of the driving shaft 4 to the right (referring to Figure 5) and also downwardly. The motion in the horizontal direction just referred to is limited by an abutment arm 11 and associated adjustable abutment bolt threaded therein. The downward pull on the sprocket end of shaft 4, due to the sprocket tending to run downwardly on the now stationary chain, causes the right-hand supporting pedestal 7 of the shaft supporting frame to become a fulcrum and the other end of the frame to be tilted upwardly a sufficient extent to so loosen the belt that the engine no longer supplies substantial torque to shaft 4. Accordingly, the torque requirement on the engine is prevented from exceeding engine capacity and the engine continues to run. In order to maintain this condition and permit ready removal of the obstruction which caused the stoppage, I provide a lever 12 pivoted on the guiding handle of the mower adjacent the handle bar and which lever operates rod 13 connected to the shaft supporting frame member 6 whereby that frame member may be manually held in a position under which belt tension will be removed and the mower reel can be turned backwardly by application of the foot to the blade and the obstruction which caused the stoppage readily dislodged. In normal operation the lever 12 is maintained in the full line position shown in Figure 2 and in power disengaged position by means of a ring engaging one end of the handle bar of the mower. The spring 10 offers resistance to the upward tilting of the pulley end of drive shaft 4 and the tension of the spring is such that it will prevent upward tilting under loads on the mower which are within the capacity of the engine.

It will be apparent that by an inexpensive form of driving connections I have eliminated the time consuming and annoying necessity of again starting the engine which so often occurs in the operation of power motors as now commonly constructed.

I am aware that my invention may be applicable to apparatus other than mowers and that modifications may be made in the construction illustrated without departing from the essential principles thereof.

Having fully described my invention, that which I claim as novel and desire to protect by Letters Patent of the United States is:

1. In apparatus of the class described the combination with a source of power and a device driven thereby, of driving connections therebetween comprising a drive shaft, supporting means therefor including a base and a supporting frame for the drive shaft mounted on the base by means permitting rocking and tilting movement of the frame, one end of said shaft being provided with a chain driving sprocket for delivery of power to the driven device and the other end provided with a belt driven pulley actuated by the power source, and adjustable means to limit the extent of rocking movement of the sprocket carrying end of the shaft in one direction.

2. In apparatus of the class described the combination with a source of power and a device driven thereby, of driving connections therebetween comprising a drive shaft, one end of said shaft being provided with a chain driving sprocket for delivery of power to the driven device, and fulcrum means so positioned with respect to the shaft that the reaction of the driving force transmitted by the sprocket tends to tilt the shaft on said fulcrum, said drive shaft being provided with a belt driven pulley positioned opposite the fulcrum from the sprocket.

3. In apparatus of the class described the combination with a source of power and a device driven thereby, of driving connections therebetween comprising a drive shaft, supporting means therefor including a base and a supporting frame for the drive shaft mounted on the base by means permitting rocking and tilting movement of the frame, one end of said shaft being provided with a chain driving sprocket for delivery of power to the driven device and the other end provided with a belt driven pulley actuated by the power source, adjustable means to limit the extent of rocking movement of the sprocket carrying end of the shaft in one direction, and resilient means tending to rock the frame in said direction and to oppose tilting movement of the frame.

4. A power transmitting device comprising an element to be driven that is subject to an overload; a source of power; a shaft; means to rockably and tiltably support said shaft; means including a friction belt to rotate said shaft from said power source; and means including a chain and sprocket mechanism to drive said element from said shaft, said chain and sprocket mechanism tilting and rocking said shaft supporting means when said element is overloaded to thereby loosen said belt and disconnect said power source from said shaft.

5. A power transmitting device comprising an element to be driven that is subject to an overload; a source of power; a shaft; means to rockably and tiltably support said shaft; means including a friction belt to rotate said shaft from said source, said belt kept taut by the torque transmitted; means to initially tighten said belt; and means including a chain and sprocket mechanism to drive said element from said shaft, said chain and sprocket mechanism tilting said shaft supporting means when said element is overloaded to thereby loosen said belt and disconnect said power source from said shaft.

6. A power transmitting device comprising an element to be driven that is subject to an overload; a source of power; a shaft; means to rockably and tiltably support said shaft; means including a friction belt to rotate said shaft, said belt kept taut by the torque transmitted; means to initially tighten said belt; means to limit the rocking and tilting motion of said shaft; and means including a chain and sprocket mechanism to drive said element from said shaft, said chain and sprocket mechanism tilting said shaft supporting means when said element is overloaded to thereby loosen said belt and disconnect said power source from said shaft.

EDWARD THOMSON.

REFERENCES CITED

The following references are of record in the file of this patent:

UNITED STATES PATENTS

| Number | Name | Date |
|---|---|---|
| 805,748 | Pfanschmidt | Nov. 28, 1905 |
| 1,233,516 | Shee | July 17, 1917 |
| 2,257,796 | Heineke | Oct. 7, 1941 |